(12) United States Patent
Weedon

(10) Patent No.: US 6,677,710 B2
(45) Date of Patent: Jan. 13, 2004

(54) DC OUTPUT REGULATOR USING DUAL PULSE MODULATION

(75) Inventor: Thomas C. Weedon, Belleville, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/087,581

(22) Filed: Feb. 28, 2002

(65) Prior Publication Data

US 2003/0160575 A1 Aug. 28, 2003

(51) Int. Cl.[7] ............................. G05F 1/70; H05B 37/02
(52) U.S. Cl. ........................ 315/77; 315/291; 323/207
(58) Field of Search ................. 315/77, 291, 209 R, 315/307, 224, 78, 82, 311, 226, 244, DIG. 4, DIG. 7; 323/207, 222, 205

(56) References Cited

U.S. PATENT DOCUMENTS

| | | | |
|---|---|---|---|
| 4,791,399 A | 12/1988 | Flannagan et al. | 340/71 |
| 5,083,065 A | 1/1992 | Sakata et al. | 315/307 |
| 5,461,301 A * | 10/1995 | Truong | 323/207 |
| 5,517,064 A | 5/1996 | Murakami | 307/10.1 |
| 6,118,371 A | 9/2000 | Haddad et al. | 340/458 |
| 6,198,234 B1 | 3/2001 | Henry | 315/291 |
| 6,198,642 B1 * | 3/2001 | Kociecki | 363/37 |

* cited by examiner

Primary Examiner—Don Wong
Assistant Examiner—Chuc Tran
(74) Attorney, Agent, or Firm—Brinks Hofer Gilson & Lione

(57) ABSTRACT

In accordance with the teachings of the present invention, an apparatus and method are provided for DC output regulation using dual pulse modulation. A DC output is regulated by reducing the rms value of the output voltage by twice modulating the output. The DC voltage is first mixed with a lower frequency signal and then with a higher frequency signal in order to reduce the voltage seen by a load powered by the DC output. The rms value of the voltage can be adjusted by increasing or decreasing the number of high frequency pulses that are mixed with the on-time of the lower frequency pulses. This can be used to provide a soft start to a load during its warm-up period.

24 Claims, 8 Drawing Sheets

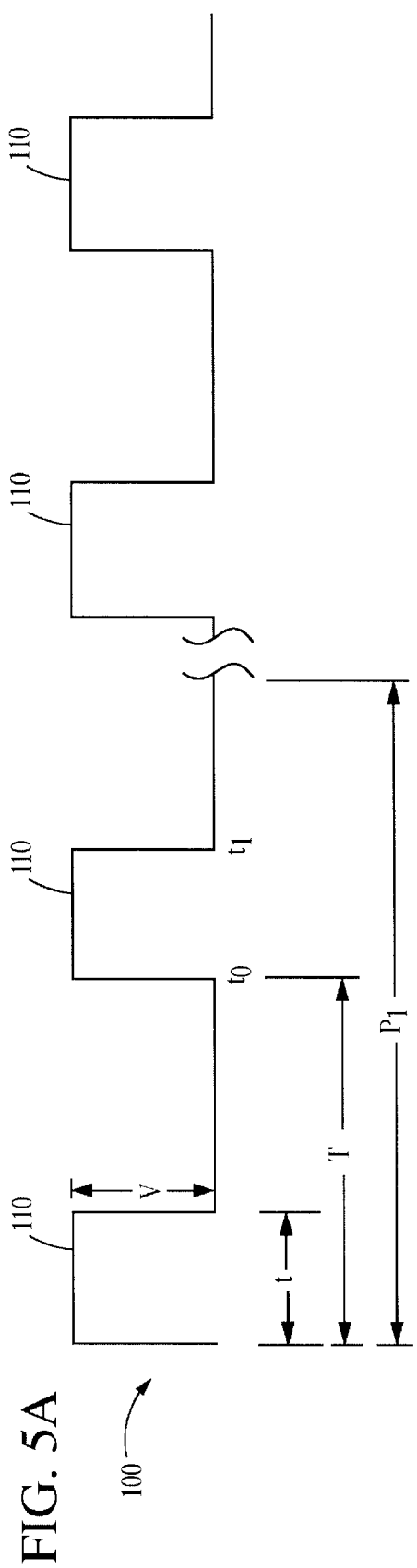
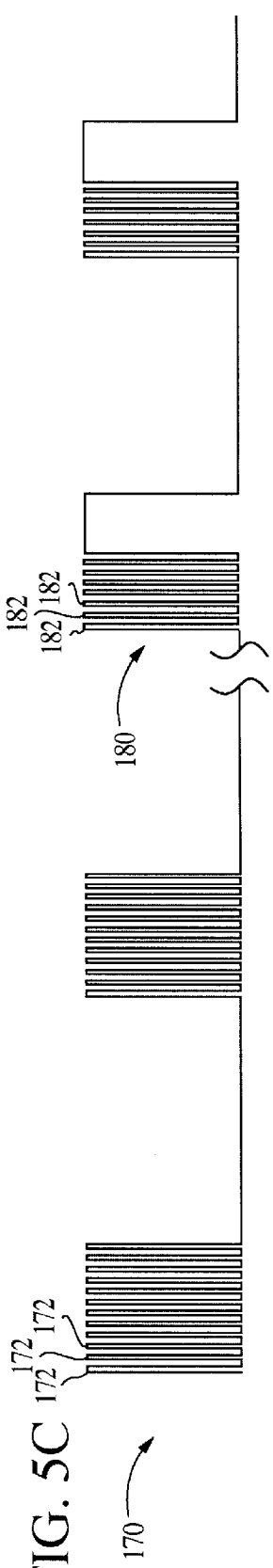
FIG. 5A
FIG. 5B
FIG. 5C

DC OUTPUT REGULATOR USING DUAL PULSE MODULATION

BACKGROUND OF THE INVENTION

There are numerous applications for which the input power must come from a DC voltage source. However, in many instances the available DC voltage supply has a voltage greater than is required or can be tolerated by an application. In these instances, a DC to DC step-down voltage converter is generally needed. Additionally, many applications can only tolerate much lower voltages while they are warming-up. In these instances, the voltage supplied to the application must be lower during start up. This can be achieved through some sort of start up mechanism. One example of an industry that will require such an application is the automotive industry. As the automotive industry moves from a 12 volt standard to a 42 volt standard, many automotive applications will be in great need of a DC voltage converter and start up mechanism.

Generally, most automobiles get their electrical power from a 12 volt battery. However, as the demand for more and more features in motorized vehicles continues to grow, so do the power demands on the vehicle's power source. Features such as electrically heated seats, electrically controlled valves and electrically-assisted power steering all place a great power demand on a vehicle. Eventually, to accommodate a greater array of features, the current 12 volt battery will be replaced by a 42 volt battery. Although there are some systems that will benefit from a new 42 volt standard power supply, some, such as incandescent lighting, actually operate better at 12 volts.

One possible method of adapting headlights to a 42 volt battery would be to design new headlights that can run directly off the 42 volt battery. However, incandescent light bulbs, such as the bulbs used in automotive headlamps, operate at a given power level. This means that if the voltage of the power supply feeding the incandescent light bulb increases, the current must decrease in order to maintain the required power. In order to achieve a decrease in current, the filament of the bulb must get longer and thinner to increase the resistance. This would require a filament made from a material that can be made very thin and still withstand shock and vibration. Therefore, running the headlamps directly off the 42 volt power supply would not allow the use of existing headlamps and would require the use of new more resilient filaments.

Alternatively, it has been suggested that the headlights may be run off the 42 volt battery if the voltage is converted from a purely DC voltage to a pulsed output. This solution is based on the fact that a pulsed signal has an effective or root-mean-square ("rms") voltage that is much lower than that of a purely DC voltage with the same amplitude. Additionally, in general, the length of time for which the filament can withstand 42 volt pulses increases as the pulses become shorter. However, this solution has a problem involving the warm-up period of the headlight. Headlights that include filaments generally need a period to warm-up. When these headlights are cold, their resistance is very low. As the filament warms up, the resistance of the filament increases which causes the current through the filament to decrease. When a voltage pulse is inputted into a cold headlight, the filament in the headlight experiences a large surge of current which can damage the headlight. This danger is increased as the magnitude of the voltage pulse increases. Therefore, the amplitude of the output of the battery needs to be reduced during the time it takes for the filament to warm-up. This would allow time for the resistance of the filament to increase, thus allowing the input current to decrease before the filament is subjected to the full voltage. However, decreasing the amplitude of the output of the battery during warm-up would require relatively complex and expensive analog circuitry.

Other solutions have included replacing the filament-type bulbs with high-intensity discharge lamps because these lamps need higher voltage to operate anyway. However, this would require replacing the filament-type bulbs already existing in automobiles and the use of complex circuitry to control the discharge current of the high-intensity discharge lamps (see U.S. Pat. No. 5,083,065). Additionally, this solution does not address the problem of current surge during warm-up.

Due to a desire to continue using existing incandescent bulbs or filament-type bulbs with a new 42 volt power supply, an intermediate solution has been proposed. During a transition period, automobiles will include both a 36 volt and a 12 volt power supply. Although this does increase the power available to the electrical and electronic applications of the vehicle and allows the use of existing filament-type bulbs, it adds a layer of complexity and duplication to the vehicle's power system, primarily due to the additional battery that is needed. Additionally, the added complexity adds weight to the vehicle and the transition period delays the ultimate adoption of the 42 volt power supply.

In order to continue the use of existing incandescent bulbs while avoiding the use of an intermediate solution, some sort of step-down DC to DC conversion and some sort of soft start mechanism must be supplied. Pulse-width modulation ("PWM") has been used to decrease the voltage to incandescent bulbs used as headlights in automobiles with the standard 12 volt power supply. The decrease in voltage is used to decrease the output illumination to provide daytime running lamps ("DRLs") or to enable the use of the high beams when the low beams have burned out. However, the use of PWM requires rather complex circuitry for implementation because the on-time of each output voltage pulse must be modulated. Furthermore, PWM does not address the issue of the power surge to the bulb before warm-up. Therefore, additional complex circuitry is needed to form the leading edge of the pulses so that a gradual current increase can be achieved until the bulb has warmed-up.

It is an object of the present invention to provide a DC to DC step-down converter and a soft start mechanism using dual modulation. It is also an object of the present invention to provide a DC to DC step-down converter and a soft start mechanism that will work with most DC applications and use relatively simple circuitry. It is also an object of this invention to provide a DC to DC step-down converter to enable the use of existing filament bulbs as headlights in automobiles with a power source of 42 volts that does not include the disadvantages of previously suggested solutions. Other objects and advantages of the present invention will be apparent from the following summary and detailed description of the preferred embodiments.

BRIEF SUMMARY OF THE INVENTION

In accordance with the teachings of the present invention, an apparatus and method are provided for DC output regulation using dual pulse modulation. A DC output is regulated by reducing the rms value of the output voltage by twice modulating the output. The DC voltage is first mixed with a lower frequency signal and then with a higher frequency signal in order to reduce the voltage seen by a load powered by the DC output. The rms value of the voltage can be adjusted by increasing or decreasing the number of high frequency pulses that are mixed with the on-time of the lower frequency pulses. This can be used to provide a soft start to a load during its warm-up period.

DC output regulators using dual pulse modulation can be used to drive the various lights present in a vehicle, such as the headlights. In general, a higher frequency pulse generator and a lower frequency pulse generator produce signals that modulate the voltage from the battery of the vehicle. If the battery is a 42 volt battery, this apparatus and technique allow the use of preexisting filament-type lights and headlights, without degrading their lifespan.

The invention provides numerous embodiments which will be understood by those skilled in the art based on the present disclosure. Some of these are described below and are represented in the drawings by means of several figures, in which:

BRIEF DESCRIPTION OF SEVERAL VIEWS OF THE DRAWINGS

FIG. 5A is a diagram of a pulsed output according to another embodiment of the present invention (not drawn to scale).

FIG. 5B is a diagram of a series of higher frequency voltage pulses of a pulse generator according to another embodiment of the present invention (not drawn to scale).

FIG. 5C is a diagram of a regulated signal according to another embodiment of the present invention (not drawn to scale).

DETAILED DESCRIPTION OF THE INVENTION

Identical features are marked with identical reference symbols in the indicated drawings. Dual pulse modulation generally involves mixing the signal of a DC power supply first with a plurality of lower frequency pulses and then with a plurality of higher frequency pulses so that the resulting regulated pulses will have an rms voltage equal to the desired input voltage of the load. This can be accomplished by adjusting the number of higher frequency pulses, the on-time of the lower frequency pulses or both. Further explanation of this method will be by way of example. It is to be understood that the following example is for the purposes of explanation and not limitation.

Figure 1A:
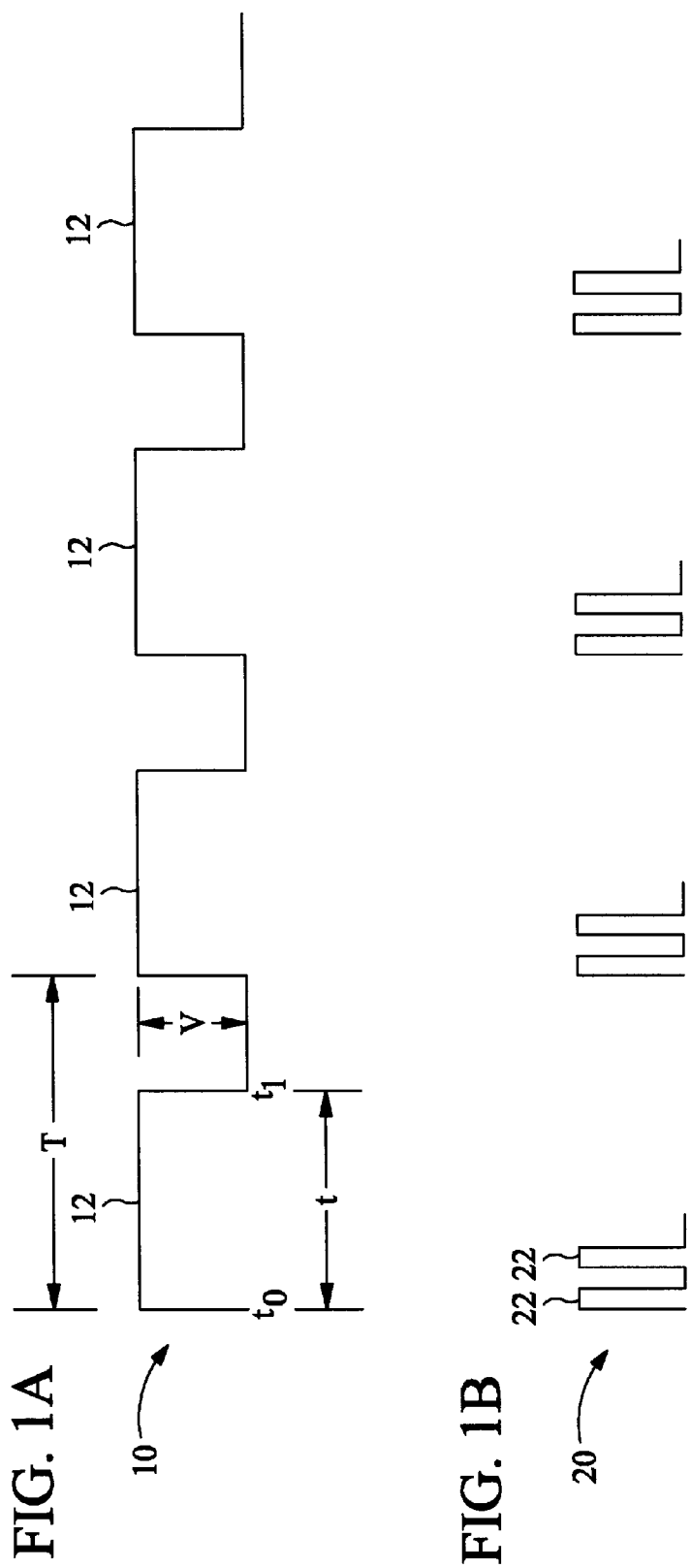
FIG. 1A is a diagram of a pulsed output according to an embodiment of the present invention (not drawn to scale).

Suppose that you have a DC load such as a motor, lamp or other application that requires an input voltage of around 9.0 volts and all you have is a 30 volt DC power supply. The 30 volt DC voltage is mixed with a plurality of lower frequency pulses in order to reduce the voltage seen by the load. The resulting pulsed output 10 is shown in FIG. 1A. This pulsed output 10 generally comprises a plurality of voltages pulses 12 each having amplitude V, period T and an on-time t which starts at $t_0$ and ends at $t_1$. Although it can be any value, assuming that the lower frequency pulses have an amplitude of 1 volt, the pulsed output will have an amplitude V equal to the amplitude of the DC voltage, and T, t, $t_0$ and $t_1$ will all equal those of the lower frequency pulses. A DC load powered by pulsed output 10, will see an effective or rms voltage according to the following equation:

$$(1) \quad V_{\max} = \sqrt{\frac{1}{T}\int_{t_0}^{t_1} V^2 \, dt} = \sqrt{\frac{1}{T}(V^2(t_1))}$$

Figure 1B:
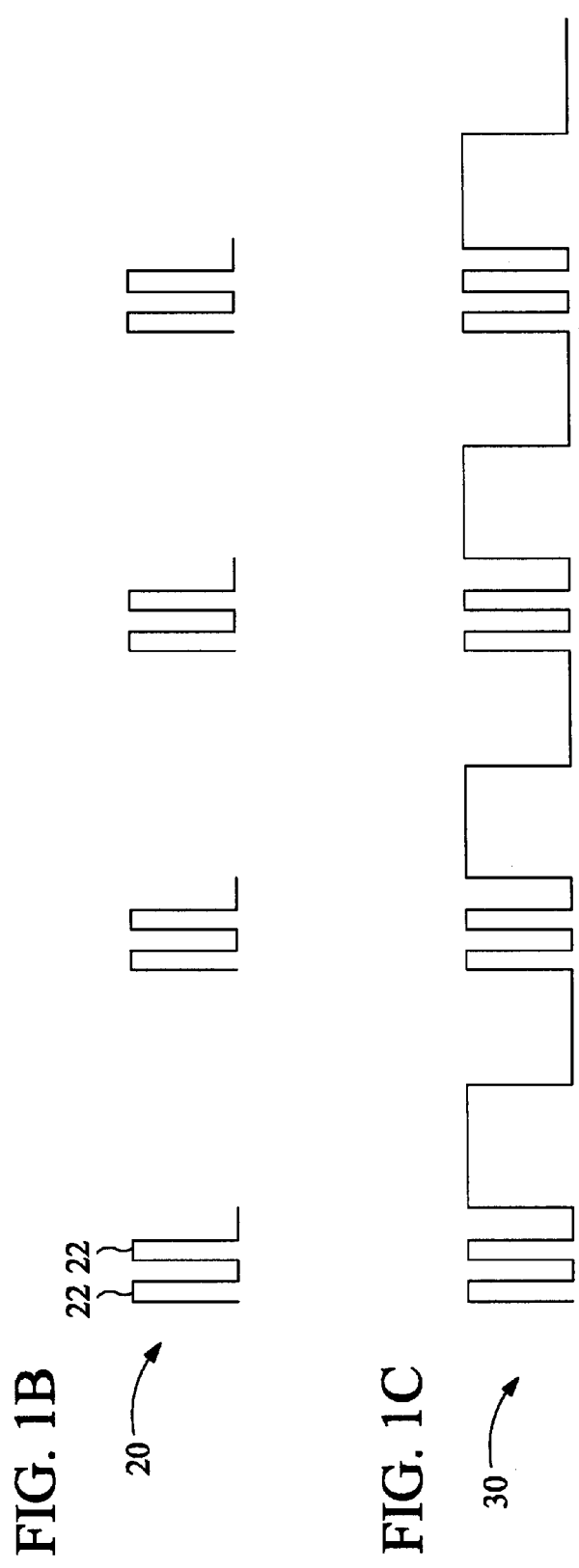
FIG. 1B is a diagram of a series of higher frequency voltage pulses of a pulse generator according to an embodiment of the present invention (not drawn to scale).
Figure 1C:
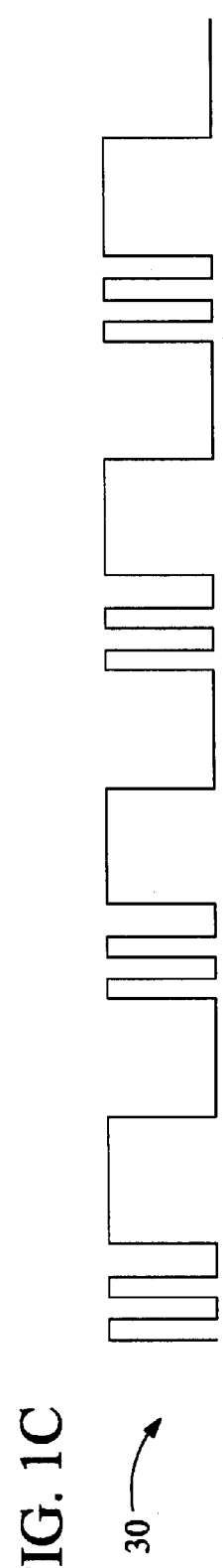
FIG. 1C is a diagram of a regulated signal according to an embodiment of the present invention (not drawn to scale).

For example, if V=30 volts, T=10 milliseconds (frequency of 100 Hz) and t=1 millisecond, $V_{rms}$ will equal 9.5 volts. Assuming the load has a very tight tolerance with regard to input voltage, the Vrms of the power supply will have to be further reduced. This can be accomplished by first generating a plurality of higher frequency pulses 20, as shown in FIG. 1B. In this example there are two higher frequency pulses. The two higher frequency pulses 22 would repeat every period T of the pulsed output, and thus would be generated for only a fraction of the on-time t of the pulsed output. In this example, each of the pulses 22 has an amplitude of 1 volt, a frequency of 10 kHz, and a duty-cycle of 75%. This means that these higher frequency pulses 22 have an on-time of 0.075 milliseconds. If the pulsed output 10 is mixed with the plurality of higher frequency pulses 20, the result would be the regulated output 30 shown in FIG. 1C. Essentially, the on-time of output 10 has been reduced by the total on-time of the pulses 22 occurring during t which, in this example, is 0.15 milliseconds. Using Equation (1), the regulated output 30 has an rms voltage of 9.0 volts. Now the regulated output approaches the input voltage required by the load.

As previously stated, the foregoing is just one example of how rms voltage can be reduced using dual pulse modulation. It involves choosing the duty cycle of the lower and higher frequency pulses so that the resulting regulated output will have the desired rms voltage. Furthermore, the duty-cycle of both the lower frequency pulses 10 and the higher frequency pulses 20 can be of any value between 0 and 100% and their frequencies can be of any value. Additionally, the amplitude A of the higher frequency pulses is not limited to 1 volt.

Dual pulse modulation can also be used to provide a soft-start to an application by further reducing the rms voltage seen by that application as it warms-up to its operating temperature. Further explanation of this method will be by way of example. It is to be understood that the following example is for the purposes of explanation and not limitation.

Figure 2A:
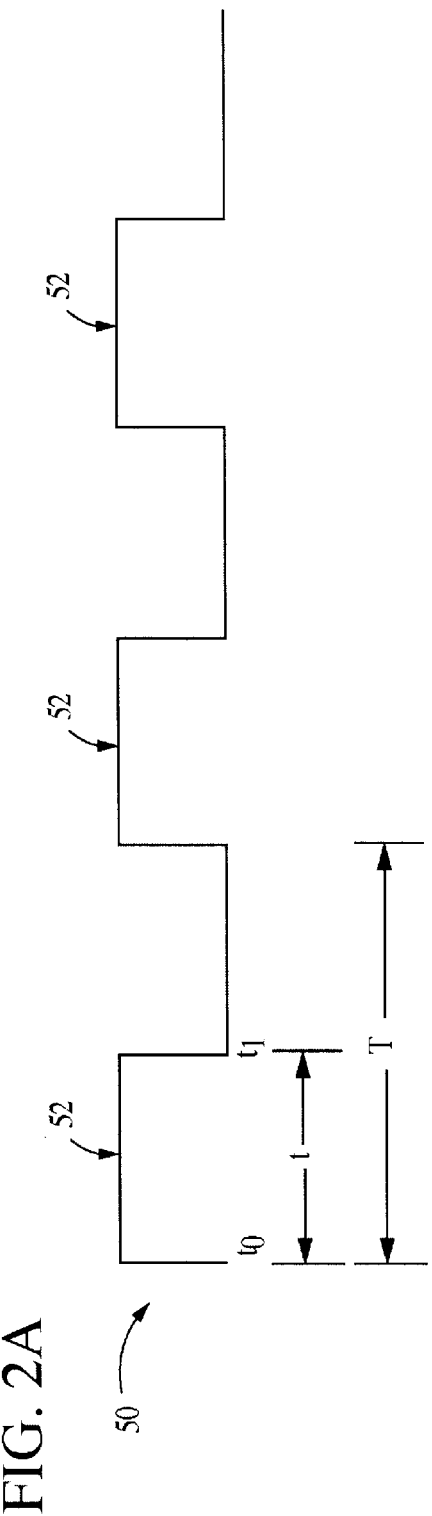
FIG. 2A is a diagram of a pulsed output according to another embodiment of the present invention (not drawn to scale).

As in the previous example, we have 30 volt DC power supply. This DC voltage is mixed with a plurality of lower frequency pulses to yield the pulsed output 50 shown in FIG. 2A. This pulsed output 50 generally comprises a plurality of voltages pulses 52 each having amplitude V, period T and an on-time t which starts at $t_0$ and ends at $t_1$. As in the previous example, if V=30 volts, T=10 milliseconds (frequency of 100 Hz) and t=1 millisecond, $V_{rms}$ will equal 9.48 volts. Suppose, however, that you have a DC load such as a motor, lamp or other application, that requires an input voltage of around 9.0 volts and can only handle a voltage of around 7.5 volts until it warms-up to its full operating temperature. The Vrms of the power supply will have to be reduced to 9.0 volts until the load has fully warmed-up.

Figure 2B:
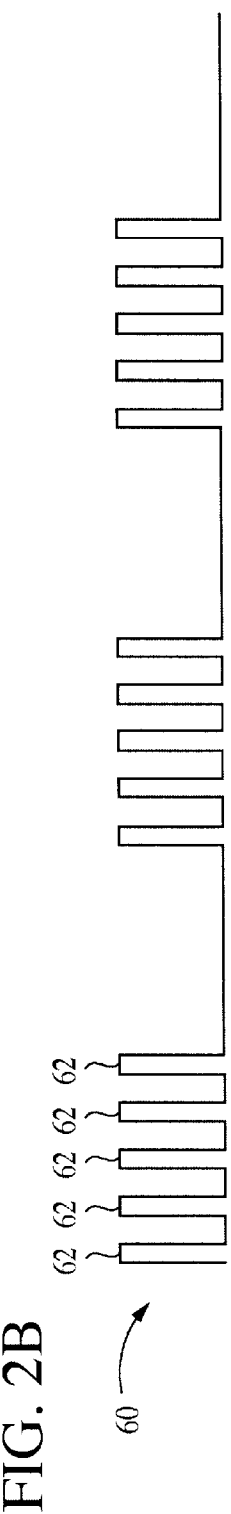
FIG. 2B is a diagram of a series of higher frequency voltage pulses of a pulse generator according to another embodiment of the present invention (not drawn to scale).

In order to decrease the rms voltage of the output 50, a plurality of higher frequency voltage pulses repeating every T 60 is created as shown in FIG. 2B. In this example, the higher voltage pulses have a frequency of 10 kHz and a duty-cycle of 75%. This means that they each have an on-time of 0.075 milliseconds.

Figure 2C:
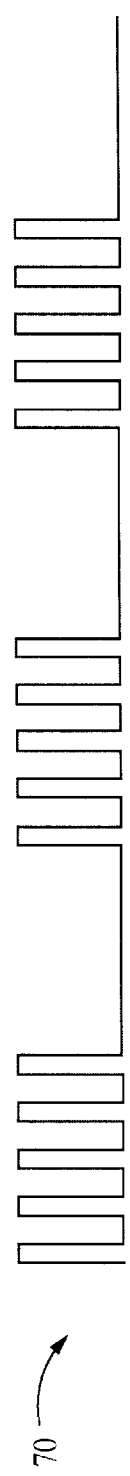
FIG. 2C is a diagram of a regulated signal according to another embodiment of the present invention (not drawn to scale).

The repeating higher frequency pulses 60 are mixed with the output 50 to yield the regulated output 70 shown in FIG. 2C. In general, the on-time of the output 50 has been reduced by 0.375 milliseconds (5 pulses each with 0.075 millisecond on-time). The rms voltage of the regulated output is 7.5 volts which approaches the voltage needed by the load during its warm-up period. Once the load has reached its operating temperature, the output 50 can then be mixed with only two higher frequency voltage pulses 62 so that the regulated output 70 has an rms voltage of 9 volts.

The foregoing explanation was only an example of a method for providing a soft start with dual pulse modulation. In general, each of the higher frequency voltage pulses 62 may have a duty cycle between 0 and 100%, a frequency that is generally much higher than that of the output 50 and any amplitude. There can be any number of these higher frequency voltage pulses 62 however this number is limited by the frequency and duty cycle of the individual pulses in both the high and low frequency pulses. The repeating higher frequency pulses 60 can be generated for only the on-time t of the output 50, as shown in FIG. 2B or may be generated for any time t through T of the output 50.

Figure 3:
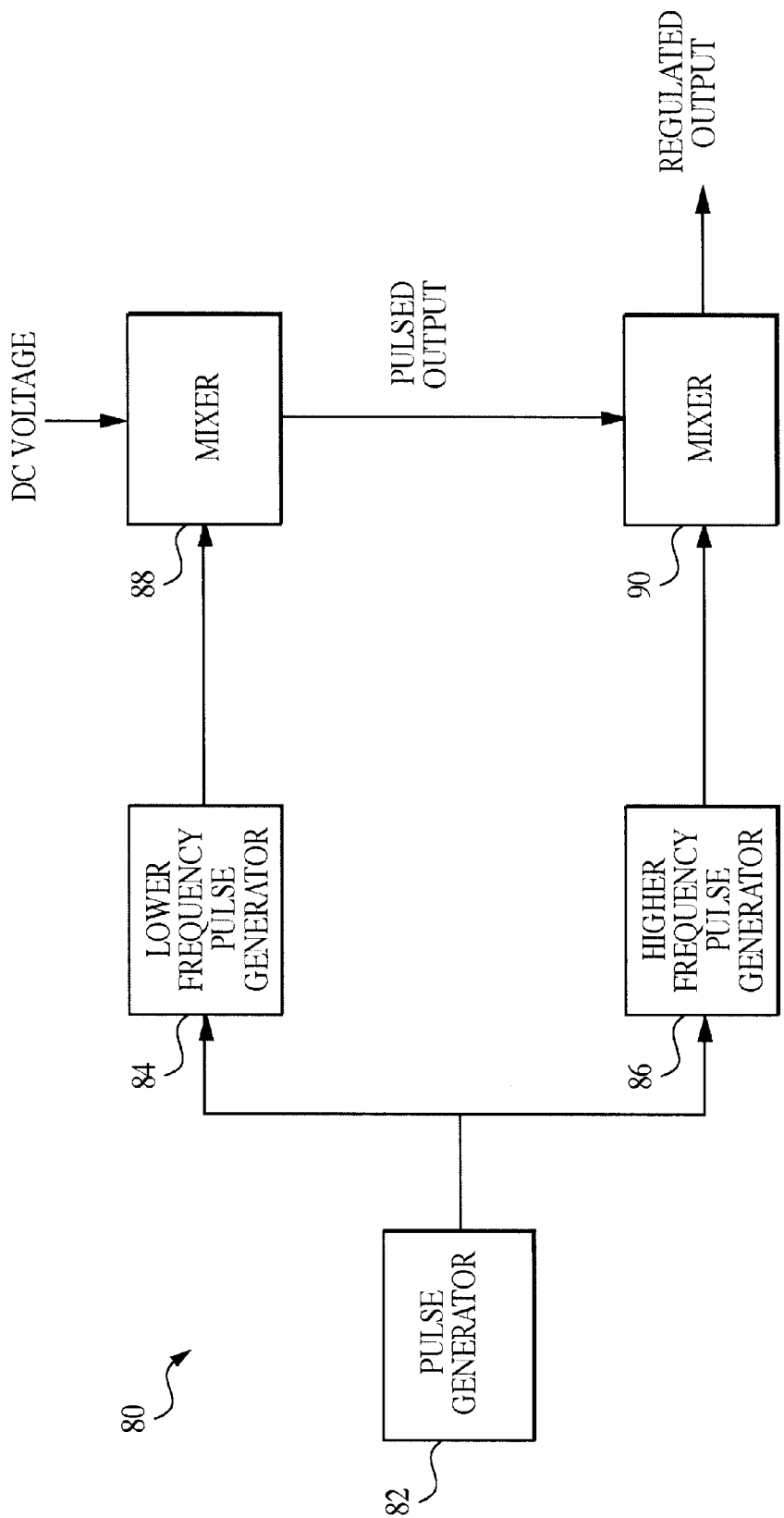
FIG. 3 is a block diagram of an embodiment of a DC output regulator according to the present invention.

FIG. 3 shows a basic hardware implementation of a dual pulse modulation process. The DC output regulator 80 generally includes a lower frequency generator 84 and a higher frequency pulse generator 86. Both generators 84, 86 are driven by a pulse generator 82. The series of pulses generated by the lower frequency pulse generator 84 is mixed with a DC voltage in a first mixer 88 to create a pulsed output. The series of pulses generated by the higher frequency pulse generator 86 is mixed with the pulsed output in a second mixer 90 to produce the regulated output.

Figure 4:
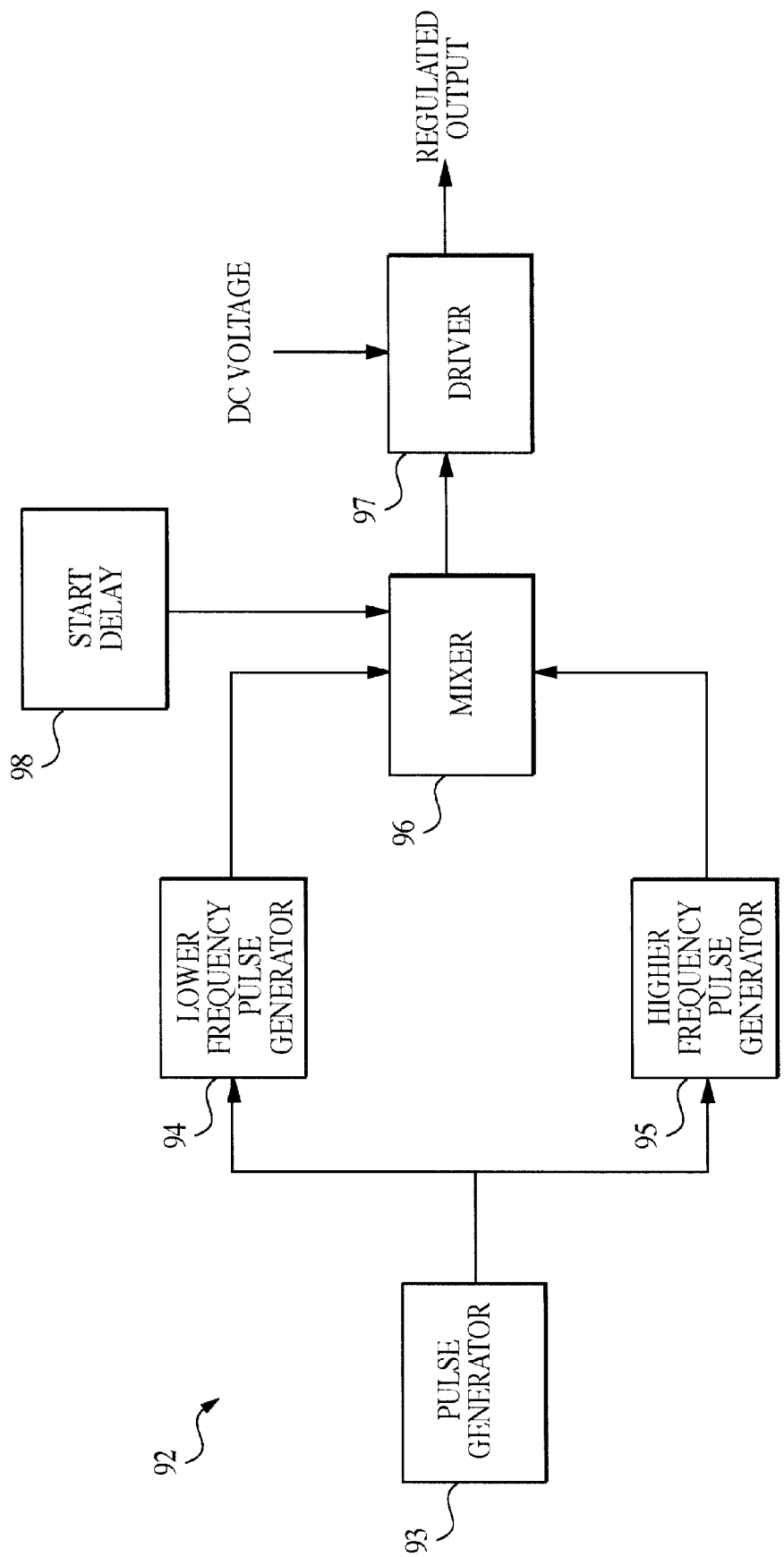
FIG. 4 is a block diagram of another embodiment of a DC output regulator according to the present invention.

FIG. 4 shows an alternative implementation of the basic hardware of a dual pulse modulation process. This implementation can be used if the load to be driven requires a driver, or if it is not feasible to connect the DC voltage directly to a mixer. The DC output regulator 92 generally includes a lower frequency pulse generator 94 and a higher frequency pulse generator 95. Both generators 94, 95 are driven by a pulse generator 93. The series of pulses generated by the lower frequency pulse generator 94 is mixed with the series of pulses generated by the higher frequency pulse generator 95 by the mixer 96. The output of the mixer 96 feeds a driver 97 which is also fed by the DC voltage. The driver 97 mixes the output and the DC voltage to form a regulated output. In addition, if the load to be driven requires a warm-up period, a start delay circuit 98 can be coupled to the mixer 96 so that the mixer 96 will output a stream of lower frequency pulses that has been fully modulated by the higher frequency pulses for the warm-up period of the load (a soft start).

These circuits and their equivalents can be implemented using a variety of known components and circuits in a wide variety of arrangements known to those skilled in the art. However, a preferred embodiment is implemented in an integrated manner on a single chip or wafer. Increase control and functionality can be obtained if the DC output regulator 80 is controlled by a computer or microprocessor. This microprocessor or computer may be a discrete component or may be integrated with the remainder of the output regulator on a single chip or wafer. Alternatively, a microprocessor or computer can be programmed to perform the all the functionality of the DC regulators in FIGS. 3 and 4 except that of the driver.

In one specific embodiment, the dual pulse modulation method is used to provide power from a 42 volt pulsed power supply to a 12 volt filament-type headlight, such as the headlights available today. This is accomplished using dual pulse modulation. Basically, the DC voltage of a vehicle battery is first mixed with a lower frequency set of pulses to yield a pulsed output. The pulsed output is then mixed with a second, higher frequency set of pulses so that the rms voltage of the resulting regulated output is at the desired level. In this embodiment, two separate regulated outputs are created, the first during a warm-up period and the second during a running period.

During the warm-up period, the goal is to decrease the current through the filament until it has time to warm-up. A further goal is to supply the power to the headlight using a plurality of high frequency pulses because high frequency voltage pulses at 42 volts are less detrimental to the headlight's lifetime than are low frequency 42 volt pulses. This is achieved by decrease the average pulse on-time, in general by about 50%. The average on-time is reduced by first mixing the DC voltage of the battery with a plurality of lower frequency pulses to create a pulsed output and then mixing the pulsed output with a plurality of higher frequency voltage pulses. FIG. 5A shows the pulsed output 100, which includes a series of output pulses 110, that results from mixing the DC voltage of the battery with a plurality of lower voltage pulses. In general, the frequency of the output pulses 110 (which equals that of the lower frequency pulses) can range from about 100 Hz through around 120 Hz. In this example frequency=100 Hz (period T=10 millisecond), amplitude V=42 volts, and on-time t is 12.5% of T (t=1.25 milliseconds). Using formula (1), the pulsed output has 14.85 Vrms. FIG. 5B shows a plurality of higher frequency voltage pulses. These higher frequency pulses 152 may generally have a frequency that varies from about 10 kHz through about 50 kHz. Preferably their frequency is from about 10 kHz through about 20 kHz. In this example, the higher frequency pulses 152 have a frequency of approximately 10 kHz, an amplitude of approximately 1 volt and a duty cycle of approximately 50%. This gives each higher frequency voltage pulse an on-time of approximately 0.05 milliseconds.

P1 is the warm-up period of the filament and is generally about 100 milliseconds. During the warm-up period PI, the higher frequency pulses are mixed with the pulsed output for the entire duration of the on-time t. This means that approximately 12.5 higher frequency pulses are mixed with the pulsed output during the on-time t of the pulsed output. The resulting regulated output, shown in FIG. 3C, has an on-time that is about one-half that of the output of the pulsed output shown in FIG. 3A, an amplitude V that is about 42 volts, and an rms voltage of about 10.5 volts. This lower voltage will lower the current of the headlight during the warm-up period to avoid damage to the filament. In addition, the regulated output voltage will further limit the current through the filament because the frequency is high enough to allow the normal inductance and capacitance of the headlight to shape the leading edge of each pulse, thereby yielding a softer start up condition.

After the filament has reached its operating temperature, usually after about 100 milliseconds, the second period or the running period P2 commences. During this period the goal is to achieve a regulated voltage of around 12.6 rms. This is done by mixing a fraction of the on-time of the pulsed output with 7 higher frequency pulses having a frequency of about 10 kHz. This yields a regulated output voltage of around 12.6 volts. So long as the filament can tolerate it, it is also possible to increase the brightness of the headlight by reducing the number of higher frequency pulses. If the number of higher frequency pulses is reduced to zero, the regulated output voltage has an rms value of about 14.85 volts.

When the lighting system of a vehicle includes a DC output regulator using dual pulse modulation and is controlled by a computer or microprocessor, many applications in addition to those already disclosed, become possible. For instance, daytime running lamps ("DRL") can be provided by mixing the pulsed output, created by mixing the DC voltage of the battery with a plurality of lower frequency pulses, with a plurality of higher frequency pulses so that the regulated output powers the headlights to only 70% of the headlight's full brilliance.

Additionally, many features involving dimming the intensity of the headlights when a certain condition is sensed by the computer can also be implemented using dual pulse modulation. For instance, a "dim on idle" feature which lowers the intensity of the headlight when the car is in idle, can be implemented in a manner similar to that of the DRL. This can be a tremendous source of power savings. Another example of a power-saving feature includes reducing the intensity of the headlights when a computer senses that other predetermined features are running, such as heated windows and air conditioning, and restoring the intensity when the computer senses that the predetermined features are no longer in use. In another example, the computer can be programmed to dim the headlights, at any dim rate, after a predetermined time following the shutting down of the engine.

The dual pulse modulation method and apparatus can also be used as part of the vehicle's security and safety system. The headlights can be made to flash on and off at any rate and at any intensity. Additionally, if a headlight burns out, the loss of current load can be sensed and communicated back to the computer which can then alert the driver.

In another application, dual pulse modulation can be used to implement programmable lamp assignments. Some headlight related applications are implemented in a particular configuration that varies with the type of vehicle in which it is installed. For instance, the hazard warning application may be configured so that the turn signal lights flash on and off, or so that the brake lights flash, or so the headlights or any combination of lights flashes on and off. This can be easily implemented through the use of software, without any extra wires or hardware if dual pulse modulation is used in conjunction with a computer or microprocessor. It should be kept in mind that any of the previously mentioned features may be used alone or in any combination. Additionally, all the previously mentioned applications are not limited to headlights, but may be applied to any of a vehicle's illumination systems and mechanisms.

An output regulator that implements dual pulse modulation that can be used for vehicular applications is the implementation previously discussed and shown in FIGS. 3 and 4. The output regulator 80 or 92 can be used to regulate the DC voltage of a battery to create a regulated rms voltage suitable for vehicular lights such as headlights, break lights, turn signal lights and other similar lights. However, output regulators 80 and 92 can supply a regulated output to one light.

Figure 6:
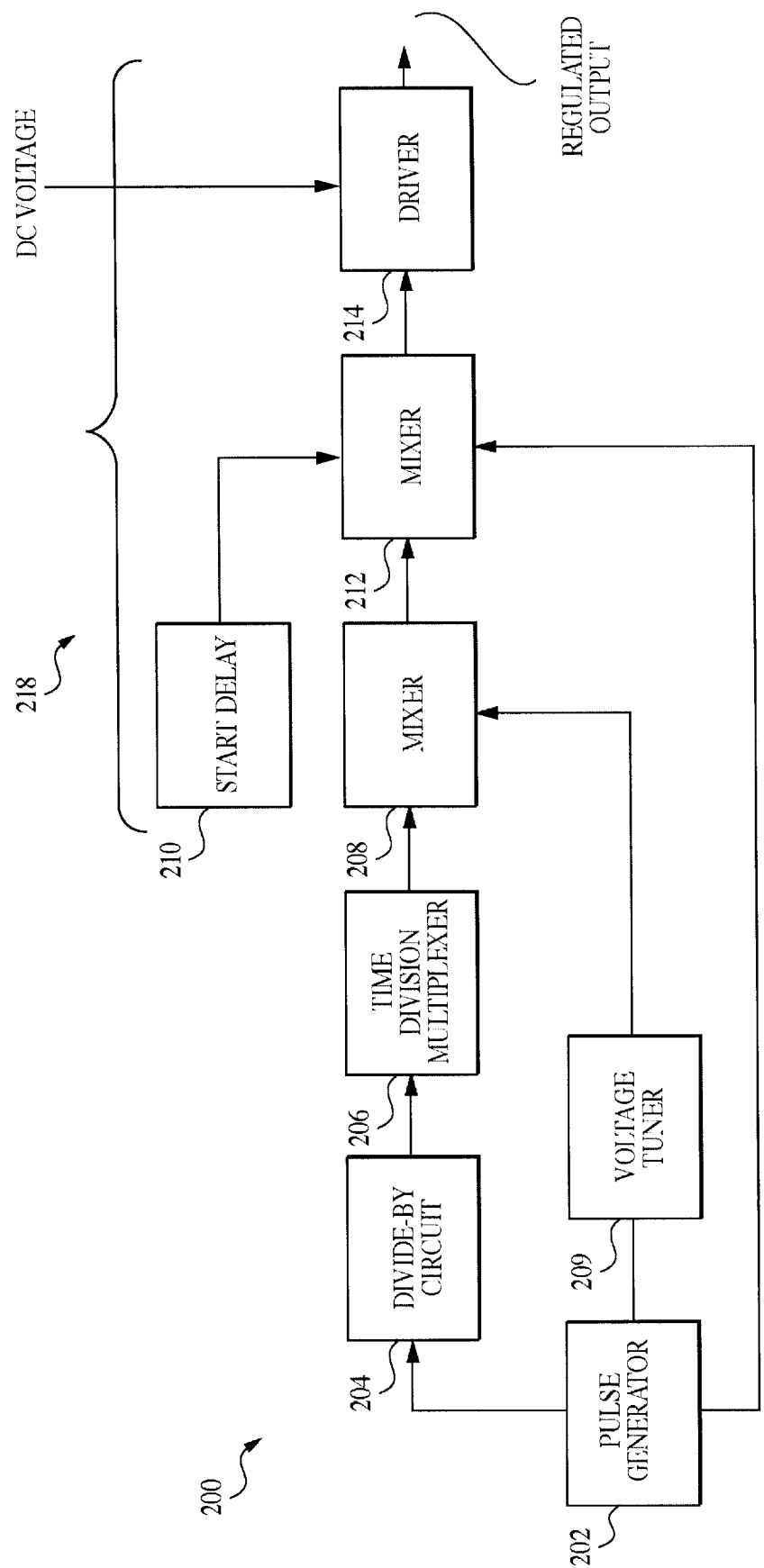
FIG. 6 is a block diagram of an vehicular lamp system according to the present invention.

FIG. 6 shows an embodiment of DC output regulator 200 that can be used to provide a regulated output to multiple lights. In this embodiment, a light driver circuit 218 is provided for each light that is to be driven by the DC output regulator. One implementation is shown in FIG. 6. The vehicular DC output regulator 200 generally includes a pulse generator or clock 202, a voltage tuner 209, a divide-by circuit 204, a time division multiplexer 206, and one or more light driver circuits 218.

In general, the divide-by circuit 204 together with the time division multiplexer 206 functions as the lower frequency pulse generator which generates a plurality of lower frequency pulses for each of the light driver circuits. The divide-by circuit 204 divides the frequency of the pulses generated by the pulse generator and divides them by a predetermined number. The output of the divide-by circuit 204 provides the switching signal or switch time to the time division multiplexer 206. The time division multiplexer 206 has multiple outputs (not shown). It will provide an output signal one of the multiplexer's outputs for the duration of one switch time, then it provides an output signal to the next output and so on. This means that each of the multiplexer's outputs produces a signal with an on-time equal to the switch time and a period equal to the switch time multiplied by the number of outputs. For example, if the pulse generator 202 produces a 10 kHz stream of pulses and the divide-by circuit 204 is a divide-by-ten circuit, the divide-by circuit 204 will produce a 1 kHz stream of pulses, having a period of 1 millisecond. Now suppose that the DC output regulator 200 is to drive eight separate lights. This means that the time division multiplexer 206 will have eight outputs. The multiplexer 206 will produce a stream of pulses at each output with an on-time of 1 millisecond and a period of 8 milliseconds (125 Hz). Using formula (1), the rms voltage of this stream of pulses is 14.85 volts. Thus the multiplexer 206 serves as a lower frequency pulse generator.

In general, the pulse generator 202 and the voltage tuner function as a higher frequency pulse generator 202. The pulse generator 202 outputs a series of higher frequency pulses and the voltage tuner controls the number of higher frequency pulses delivered to the light driver circuit 218.

The light driver circuit 218 generally includes a first mixer 208, a second mixer 212, a start delay 210 and a driver 214. The first mixer 208 mixes one output of the multiplexer 206 (the lower frequency pulses) with the output of the voltage tuner 209 (a number of higher frequency pulses). As previously discussed, the higher frequency pulses reduce the rms voltage of the lower frequency pulses. Thus the rms voltage may be tuned by the number of higher frequency pulses. This can be used to more precisely tune the voltage that will reach the light or for applications that require light dimming such as DRLs.

Each light driver circuit 218 further includes a start delay 210 and a second mixer 212. These components enable the DC output regulator 200 to provide a lower voltage to the lights during their warm-up period. The second mixer 212 is coupled to the pulse generator 202 and will mix the higher frequency pulses from the pulse generator 202 for the entire on-time of the pulses outputed by the first mixer 208 for a time period communicated by the start delay 210. After the warm-up period, the second mixer 212 will simply transmit the pulses output by the first mixer 208. The output of the second mixer 212 is fed to a driver 214 which mixes the output of the second mixer 212 with the DC voltage to create a regulated output that can be used to power a light.

Figure 7:
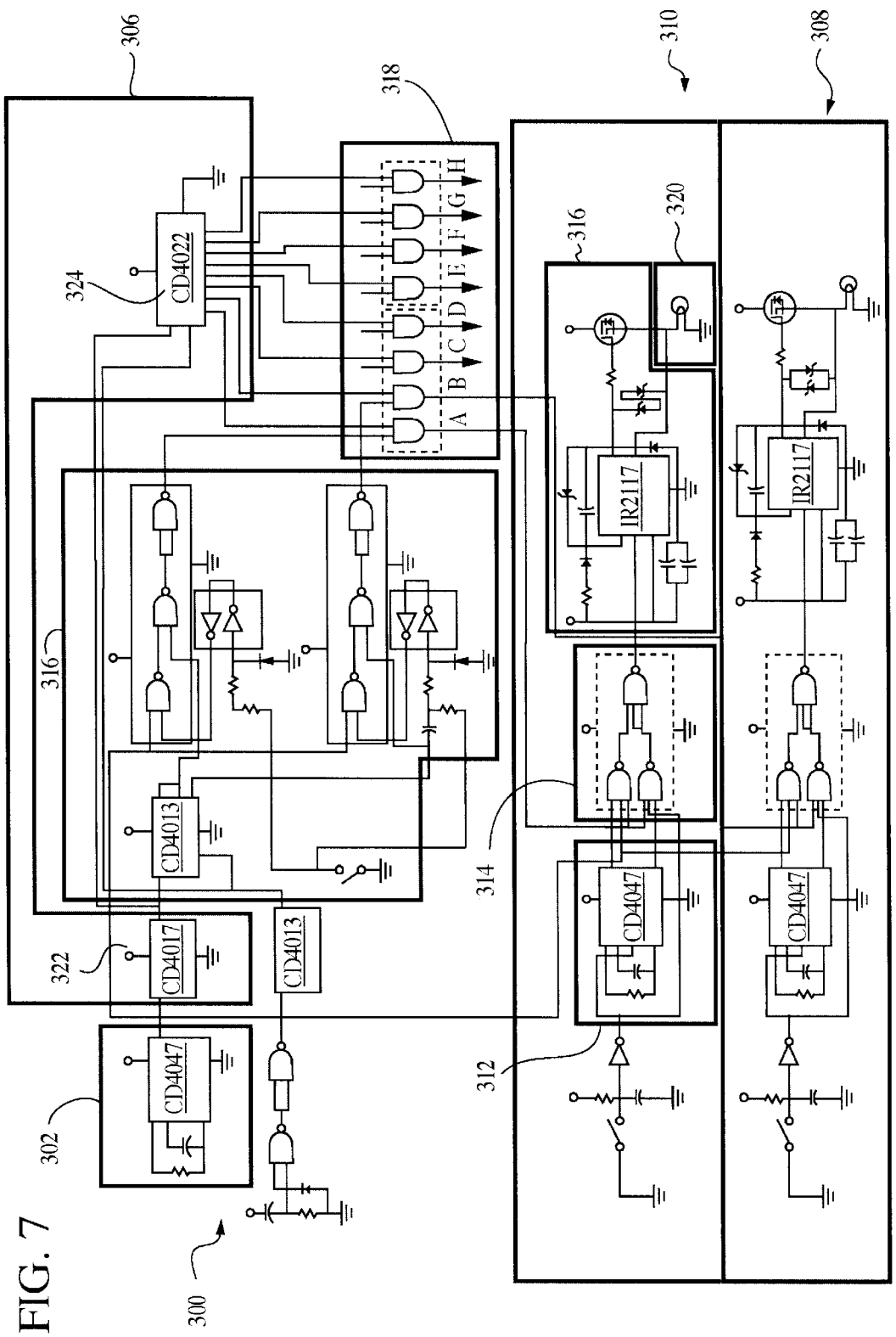
FIG. 7 is a circuit diagram of the implementation of dual pulse modulation for a light in a 42 volt vehicular environment according to the present invention.

FIG. 7 shows a more detailed circuit diagram of the apparatus shown in FIG. 6. This DC output regulator 300 includes a pulse generator 302 and a voltage tuner 316, which together comprise a higher frequency generator, a lower frequency pulse generator 306 that includes a divide-by ten circuit 322 and a multiplexer 324, a first plurality of mixers 318 and a plurality of lamp driver circuits 308 and 310. In this example, the multiplexer 324 has eight outputs and therefore could drive up to eight lamp driver circuits, although only two are shown. The lamp driver circuits 310 include a start delay 210, a second mixer 314, a driver 316 and a lamp 320.

Figure 8:
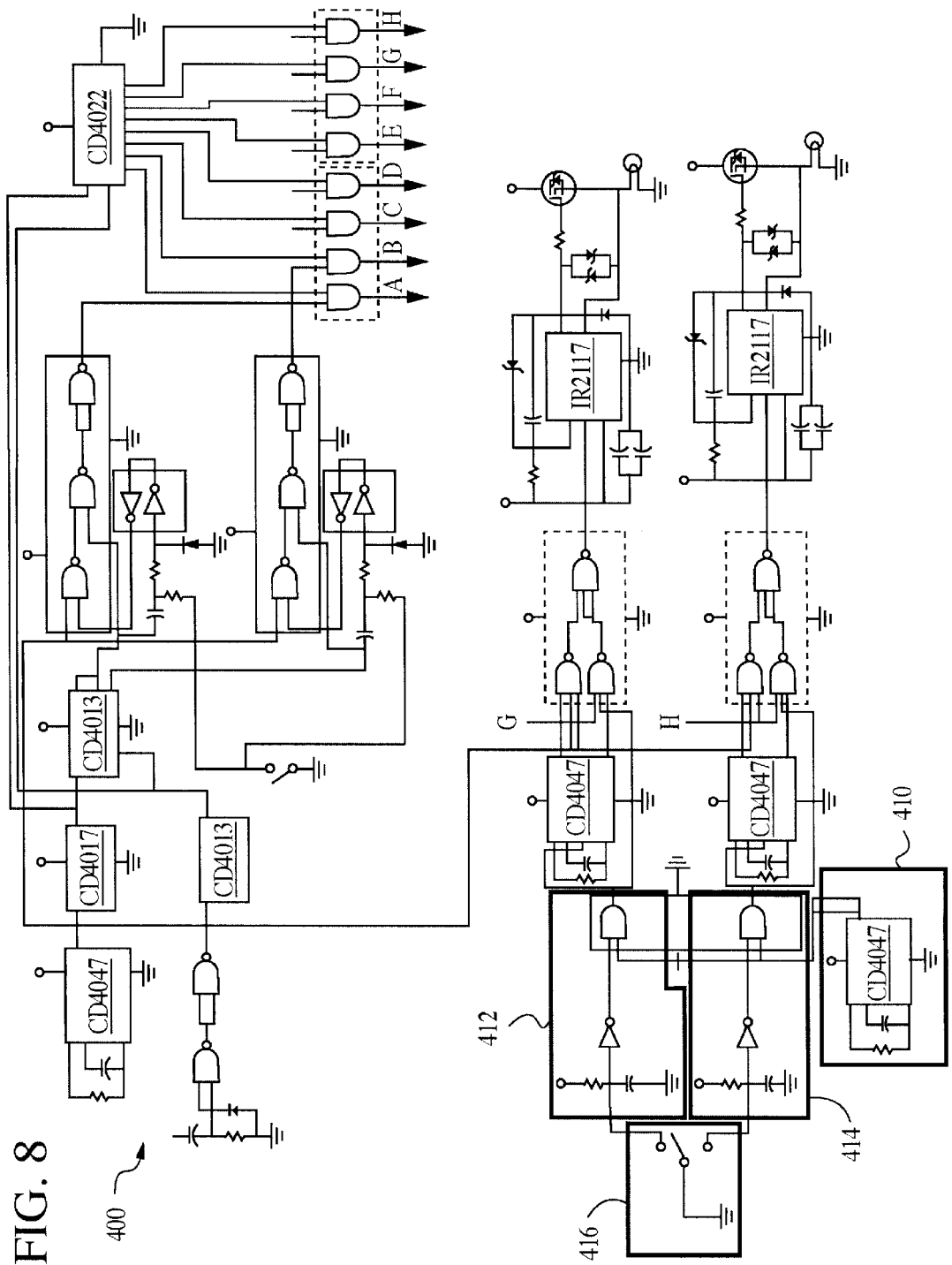
FIG. 8 is a circuit diagram of the implementation of dual pulse modulation for light flashers in a 42 volt vehicular environment according to the present invention.

FIG. 8 shows another more detailed embodiment of the DC output regulator 400 that provide a flasher function. In this embodiment, the flasher function is implemented for two separate lamps. It has all the same components as the DC output regulator 300 in FIG. 7, and also includes a switch 416, a flasher control signal generator 410 and a right flasher input 414 and a left flasher input 412. The switch 416 allows a choice in which light is to flash. The flasher control signal generator 410 generates a signal that controls the flash rate, such as 10 Hz. However, this frequency can be of any value. When the switch 416 completes the circuit for one of the lights, the flasher control signal generator 410 controls the flash rate of the light.

Although the invention has been described in terms of specific embodiments and applications, persons skilled in the art can, in light of this disclosure, generate additional embodiments without exceeding the scope or departing from the spirit of the claimed invention. For example, the apparatus may comprise many different components and circuits. Furthermore, the method may include a variety of frequencies, on-times, periods and other values. Furthermore, the method may be implemented in hardware and software in discrete components, in a fully integrated manner or any combination of the two. Accordingly, it is to be understood that the drawings and descriptions in this disclosure are proffered to facilitate comprehension of the invention and should not be construed to limit the scope thereof.

I claim:

1. An apparatus for regulating a voltage output of a DC power supply, comprising:
   a pulse generator;
   a lower frequency pulse generator driven by the pulse generator;
   a first mixer electrically coupled to the lower frequency pulse generator and the voltage output;
   a higher frequency pulse generator driven by the pulse generator; and
   a second mixer electrically coupled to the higher frequency pulse generator and the first mixer, wherein the second mixer produces a regulated DC output.

2. An apparatus for regulating a voltage output of a DC power supply, comprising:
   a pulse generator;
   a lower frequency pulse generator driven by the pulse generator;
   a higher frequency pulse generator driven by the pulse generator;
   a mixer electrically coupled to the lower frequency pulse generator and the higher frequency pulse generator; and
   a driver coupled to the mixer and the output of the DC power supply, wherein the driver produces a regulated DC output.

3. An apparatus for regulating a voltage output of a DC power supply as claimed in claim 2, further comprising a start delay coupled to the mixer.

4. An apparatus for regulating the output of a DC power supply comprising a means for creating dual pulse modulation, wherein the means for creating dual pulse modulation further comprises: a mean for providing a soft start to a load; and
   a means for reducing an rms DC voltage seen by the load.

5. A vehicular light system, comprising:
   a DC voltage source;
   a higher frequency pulse generator;
   a lower frequency pulse generator coupled to the higher frequency pulse generator; and
   a driver circuit couple to the higher frequency pulse generator, the lower frequency pulse generator and the DC source, wherein the driver produces a regulated DC output.

6. A vehicular light system as claimed in claim 5, wherein:
   the higher frequency pulse generator comprises a pulse generator and a voltage tuner coupled to the pulse generator;
   the lower frequency pulse generator comprises a divide-by circuit and a time division multiplexer coupled to the divide by circuit; and
   the driver circuit comprises:
      a first mixer, wherein the voltage tuner is coupled to the first mixer;
      a second mixer, wherein the pulse generator is couple to the second mixer;
      a start delay coupled to the second mixer; and
      a driver.

7. A vehicular lamp system as claimed in claim 6, wherein
   the filament-type light is an approximately 12 volt filament-type headlight; and
   the DC power supply provides an approximately 42 volt DC power supply.

8. A vehicular light system as claimed in claim 5, further comprising at least one flasher input coupled to the start delay and a flasher control signal generator coupled to the at least one flasher input.

9. A method of power output regulation for a DC power supply, comprising dual pulse modulation, wherein the DC power supply produces a DC voltage and wherein dual pulse modulation comprises a method of reducing an rms voltage of the DC voltage by twice modulating the DC voltage.

10. A method of power output regulation as claimed in claim 9, wherein dual pulse modulation further comprises a method of providing a soft start.

11. A method of power output regulation as claimed in claim 9, wherein the DC power supply produces a DC voltage and dual pulse modulation comprises:

mixing a plurality of first voltage pulses with the DC voltage to create a pulsed output; and mixing a plurality of second voltage pulses with the pulsed output to produce a regulated output, wherein the plurality of second voltage pulses is at a higher frequency than the plurality of first voltage pulses.

12. A method of power output regulation as claimed in claim 9, wherein the DC power supply produces a DC voltage and dual pulse modulation comprises:

mixing a plurality of first voltage pulses with a plurality of second voltage pulses, to produce an output; and mixing the output with the DC voltage to produce a regulated output.

13. A method of power output regulation as claimed in claim 12 further comprising creating a start delay.

14. A method of power output regulation as claimed in claim 12, wherein the higher frequency of the plurality of second voltage pulses is approximately between 10,000 through 50,000 Hz.

15. A method of power output regulation as claimed in claim 14, wherein the higher frequency of the plurality of second voltage pulses is approximately between 10,000 through 20,000 Hz.

16. A method of power output regulation as claimed in claim 12, wherein a frequency of the plurality of first voltage pulses is approximately between 100 through 120 Hz.

17. A method of power output regulation as claimed in claim 12, wherein the plurality of second voltage pulses is mixed with the plurality of first voltage pulses for approximately an on-time of the plurality of first voltage pulses.

18. A method of power output regulation as claimed in claim 12, wherein the plurality of second voltage pulses is mixed with the plurality of first voltage pulses for at least a fraction of an on-time of the plurality of first voltage pulses.

19. A method of power output regulation as claimed in claim 18, wherein the plurality of second voltage pulses is mixed with the plurality of first voltage pulses for at least a fraction of the on-time by varying a number of the plurality of second voltage pulses mixed with the pulsed output.

20. A method of power output regulation as claimed in claim 12, wherein mixing the plurality of second voltage pulses with the plurality of first voltage pulses comprises:

mixing the plurality of second voltage pulses with the plurality of first voltage pulses for at least an on-time of the plurality of first voltages pulses for a first period; and mixing the plurality of second voltage pulses with the plurality of first voltage pulses for a least a fraction of the on-time of the plurality of first voltage pulses for a second period.

21. A method of power output regulation as claimed in claim 20, wherein the second period follows the first period.

22. A method of power output regulation as claimed in claim 21, wherein:

the DC power supply has a voltage amplitude of approximately 42 volts; and the higher frequency of the plurality of second voltage pulses is such that when the plurality of first voltage pulses are mixed with the plurality of second voltage pulses, the rms value of the regulated output is approximately between approximately 12.5 volts and approximately 14.5 volts.

23. A method of power output regulation as claimed in claim 22, wherein:

the plurality of first voltage pulses has a frequency of approximately 100 Hz and an on-time of approximately between approximately 1 millisecond through approximately 1.3 milliseconds; and the plurality of second voltage pulses comprises two pulses and the higher frequency of approximately 10,000 Hz and a duty-cycle of approximately 50 percent.

24. A method of powering a filament-type lamp with a DC power supply, wherein a voltage supplied by the power supply exceeds an rms voltage acceptable by the lamp, comprising the steps of:

providing a soft start to the lamp, comprising the steps of:
providing a plurality of first voltage pulses including an on-time;

providing a plurality of second voltage pulses for a first period, wherein the plurality of second voltage pulses includes a frequency higher than that of the plurality of first voltage pulses;

mixing the plurality of first voltage pulses with the plurality of second voltage pulses to create an output; and mixing the output with the voltage supplied by the power supply; and reducing an rms voltage supplied by the power supply to approximately the rms voltage acceptable by the lamp, comprising the steps of:

providing a plurality of second voltage pulses for a second period, wherein the plurality of second voltage pulses includes a frequency higher than that of the plurality of first voltage pulses;

mixing the plurality of first voltage pulses with the plurality of second voltage pulses for a fraction of the on-time of the plurality of first voltage pulses for a second period to create a second output; and mixing the second output with the voltage supplied by the power supply.

* * * * *